United States Patent
Taylor et al.

(10) Patent No.: US 9,342,490 B1
(45) Date of Patent: May 17, 2016

(54) BROWSER-BASED NOTIFICATION OVERLAYS

(71) Applicant: Amazon Technologies, Inc., Reno, NV (US)

(72) Inventors: Brett Richard Taylor, Bainbridge Island, WA (US); Aakarsh Nair, Seattle, WA (US); Peter Frank Hill, Seattle, WA (US); Dhruva Lakshmana Rao Batni, Seattle, WA (US); Ranganath Atreya, Kirkland, WA (US); Patrick Joseph Armstrong, Seattle, WA (US); Peter Sven Vosshall, Bainbridge Island, WA (US); Bryan Kenneth Summersett, Seattle, WA (US); Ameet Nirmal Vaswani, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 447 days.

(21) Appl. No.: 13/682,695

(22) Filed: Nov. 20, 2012

(51) Int. Cl.
  *G06F 17/22* (2006.01)
(52) U.S. Cl.
  CPC .................. *G06F 17/2247* (2013.01)
(58) Field of Classification Search
  CPC .................................................. G06F 17/2247
  USPC ........................................................ 715/234
  See application file for complete search history.

(56) References Cited

U.S. PATENT DOCUMENTS

| | | | |
|---|---|---|---|
| 7,373,313 B1 | 5/2008 | Kahle et al. | |
| 8,015,496 B1 | 9/2011 | Rogers | |
| 8,135,617 B1 * | 3/2012 | Agostino | G06Q 30/0241 705/1.1 |
| 2003/0202009 A1 * | 10/2003 | Kasriel | 345/739 |
| 2006/0277460 A1 * | 12/2006 | Forstall et al. | 715/513 |
| 2007/0139430 A1 * | 6/2007 | Korn et al. | 345/581 |
| 2008/0163090 A1 * | 7/2008 | Cortright | 715/771 |
| 2009/0049385 A1 * | 2/2009 | Blinnikka et al. | 715/719 |
| 2009/0055737 A1 * | 2/2009 | Borchardt et al. | 715/708 |
| 2009/0249229 A1 * | 10/2009 | Offer | G06Q 30/0255 715/760 |
| 2010/0070529 A1 * | 3/2010 | Gokturk | G06Q 30/02 707/780 |
| 2010/0070889 A1 * | 3/2010 | Weisbart et al. | 715/760 |
| 2010/0287567 A1 * | 11/2010 | Hauser | 719/318 |
| 2010/0313252 A1 * | 12/2010 | Trouw | 726/7 |
| 2010/0325217 A1 * | 12/2010 | Mody et al. | 709/206 |

(Continued)

OTHER PUBLICATIONS

Kim, Joeng, Ricardo A. Baratto, and Jason Nieh. "pTHINC: a thin-client architecture for mobile wireless web." In Proceedings of the 15th international conference on World Wide Web, pp. 143-152. ACM, 2006.*

(Continued)

*Primary Examiner* — Frank D Mills
(74) *Attorney, Agent, or Firm* — Knobbe Martens Olson & Bear LLP (57) ABSTRACT

Features are disclosed for enabling users to select portions of content pages, including predefined portions and arbitrarily defined portions, for which to receive update notifications or which to share with other users. Notifications regarding updates to the selected portions may be displayed to the user in a notification overlay. The notification overlay may be at least partially transparent so as to allow users to see content on a content page displayed beneath the overlay. The notification overlay may be displayed persistently as the user navigates or otherwise transitions from page to page. Users may also access shared, predefined, and context-sensitive notification overlays created by other users, entities, or automated processes.

21 Claims, 7 Drawing Sheets

(56) References Cited

U.S. PATENT DOCUMENTS

| | | | |
|---|---|---|---|
| 2010/0325542 A1* | 12/2010 | Esposito | G06Q 30/02 715/716 |
| 2010/0325549 A1* | 12/2010 | Gibson et al. | 715/733 |
| 2011/0078615 A1* | 3/2011 | Bier | G06Q 10/10 715/779 |
| 2011/0161849 A1 | 6/2011 | Stallings et al. | |
| 2012/0266101 A1* | 10/2012 | Shah | 715/781 |
| 2012/0290938 A1* | 11/2012 | Subbarao | H04L 67/22 715/738 |
| 2013/0085855 A1* | 4/2013 | Dyor | G06F 3/017 705/14.55 |
| 2013/0263023 A1* | 10/2013 | Goodwin et al. | 715/760 |
| 2014/0053107 A1* | 2/2014 | Patel | 715/840 |

OTHER PUBLICATIONS

Web page titled "RSS Ticker: Add-ons for Firefox," https://addons.mozilla.org/en-US/firefox/addon/rss-ticker/, 3 printed pages, printed on Feb. 7, 2013.

\* cited by examiner

BROWSER-BASED NOTIFICATION OVERLAYS

BACKGROUND

Client computing devices may be used to request content pages, data feeds, and other network-accessible information from content servers. Content pages can include text, images, videos, animations, and the like. Some portions of a content page may be devoted to content that frequently changes. For example, a content page may display up-to-the-minute weather, scores, and stock quotes. In addition to content pages, content servers may provide access to information that changes frequently via Really Simple Syndication (RSS) feeds, microblog updates, and the like.

A user may consume data that changes frequently in many different ways. For example, the user may use a browser application or news reader, subscribe to email or mobile phone text notifications, and the like. Users can configure news readers to retrieve data exposed by content servers through RSS feeds and other standardized data feeds. Such news readers can be configured to routinely check for updates and new content. When updated or new content is detected, the news reader can retrieve the content and present it to a user. Users may also access portals that aggregate content from different sources. The portals may be implemented as content pages with distinct portions, and each portion may present different content or content from different sources. Typically, access to frequently changing information is provided by the particular content servers, and the consumption options are limited to those supported by the content servers themselves or by third party portals and other data aggregators.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure is directed to enabling users to select portions of content pages, including predefined portions and/or arbitrarily defined portions, for which to receive update notifications or to share with other users. Notifications regarding updates to the selected portions may be displayed to the user in a notification overlay, such as a semi-transparent notification that overlays the content page. The notification overlay may, in some embodiments, remain visible as the user navigates or otherwise transitions from page to page. Users may also access shared, predefined, and context-sensitive notification overlays created by other users, entities, or automated processes.

Some aspects of the present disclosure also relate to providing touch screen gestures and other interface options for selecting portions of content pages. For example, a user may circle a portion of a content page to select information of interest to the user. The circle may be free-form, or a gesture or other user interface option may be used to activate a selection area that the user may fit around the portion to be selected. Data regarding the selected portion, such as coordinates, markup language tags, or object identifiers may be saved locally or uploaded to a network accessible system.

Additional aspects of the present disclosure relate to displaying overlays to the user based on selected content portions. For example, a user may select a particular sports score on a content page. The sports score may then continue to be displayed to the user even if the user scrolls the display, navigates to a different content page, activates a different browser tab, etc. The selected portion may be presented as a hovering content portion, or overlay, over the content that is currently displayed in the browser application. In some embodiments, the overlay may be partially transparent so as to provide a view of the content page underneath the overlay. The overlay may be interactive, including links and other user interface controls for navigating, sending and receiving information, and the like. In addition, because the selected portion or data related thereto is displayed in an overlay, the amount of display area available for other content is not reduced, particularly when the overlay is at least partially transparent. In some embodiments, the overlay may remain displayed even if a browser application is not active. For example, if a user activates a separate application on a computing device (e.g., a book reading application) an overlay may continue to be displayed over a portion of the separate application.

Further aspects of the disclosure relate to providing and receiving updates to the selected portion and presenting the updates in the overlay. A notification system may receive data from the browser application regarding the selected portion, such as the address of the content page that includes the portion, and the coordinates of the portion. The notification system may monitor or poll a content server for changes to the selected portion of the content page, and notify the browser application of any detected change. The browser application may then display updated content in the overlay. In some embodiments, the browser application may establish a continuous connection with the notification system, such as a remote desktop connection, and automatically display, in the overlay, updates to the selected portion as the notification system processes the updated or changed content. In some embodiments, the features of the notification system may be performed by a component of the browser application or some other component of the client device instead of a separate notification system.

Still further aspects of the present disclosure relate to sharing selected portions, accessing shared and other predefined overlays, and accessing context-sensitive overlays. Users may share their selected portions with other users. For example, a user may design an overlay that may be useful to other users, such as an overlay based on local news headlines. The user may proactively share the overlay with other users or passively allow other users to access the shared overlay. In some embodiments, an overlay may be context-sensitive. For example, a browser developer, retailer, third party notification provider, or some other entity may provide a notification overlay that can be used to display pricing information relevant to an item on a content page currently displayed in the browser. The overlay may provide information about other retailers offering the same item for a lower price, or offering related items. As a user continues to browse, the information in the notification overlay can change so as to provide notifications relevant to the currently displayed content.

Although the illustrated embodiments make use of notification overlays based on user-selected content portions, predefined content portions, or context-sensitive notifications, in other embodiments an overlay may be used to present other data. For example, an intermediary system may analyze browsing activity and provide suggestions to the user in a notification overlay. The suggestions need not be context-sensitive or otherwise relevant to the currently displayed content, but rather may be suggestions based on the user's browsing history and/or the browsing histories of others. While various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

Figure 1A:
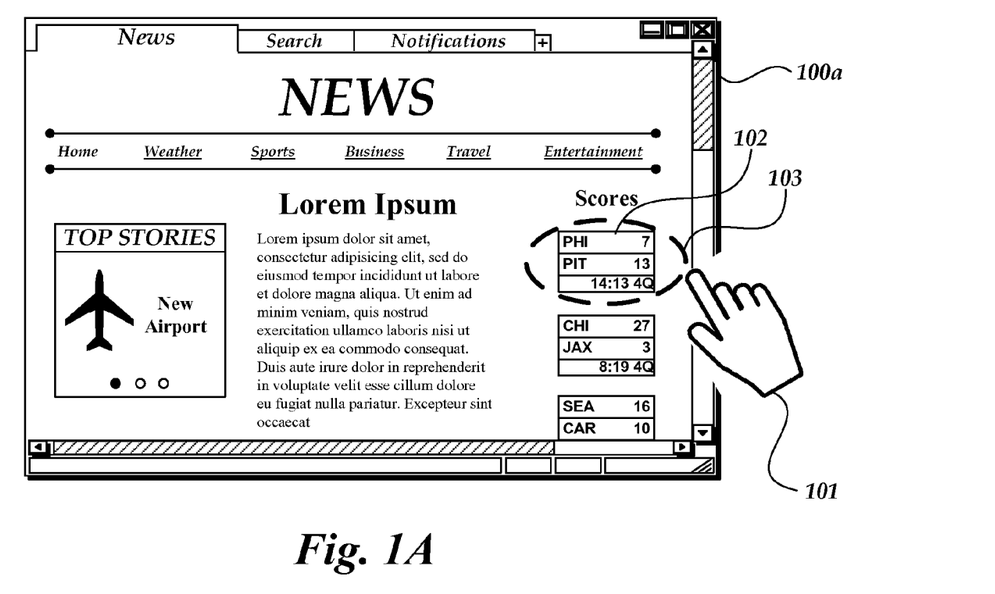
FIGS. 1A-1D are user interface diagrams of illustrative user interactions with browser content showing the selection of content for notification and the display of a notification overlay.

With reference to an illustrative embodiment, a client device may execute a browser application. A user may interact with the browser application to request content items, such as web pages or other types of documents, hosted by content servers. FIG. 1 illustrates a browser application interface 100a displaying a content item. A user 101 may select a portion of the content displayed in the interface 100a. For example, the user 101 may interact with a touch screen to draw a border 103 around a portion of the content page, such as a sports score 102. The user 101 may select the portion free-form, by encircling the selected sports score 102. In some embodiments, the user may activate a selection area by using a touch screen gesture recognized by the browser application or by activating some other user interface control. The activated selection area may be an ellipse, square, or some other visual selection effect that can be manipulated by the user to fit around the sports score 102 to be selected. In some embodiments, a touch screen gesture such as a triple tap may be used to select a portion. In such cases, the browser application may then analyze the underlying content to determine which portion the user intended to select. In embodiments that do not involve a touch screen, the border may be drawn with a mouse or other pointing device.

Figure 1B:
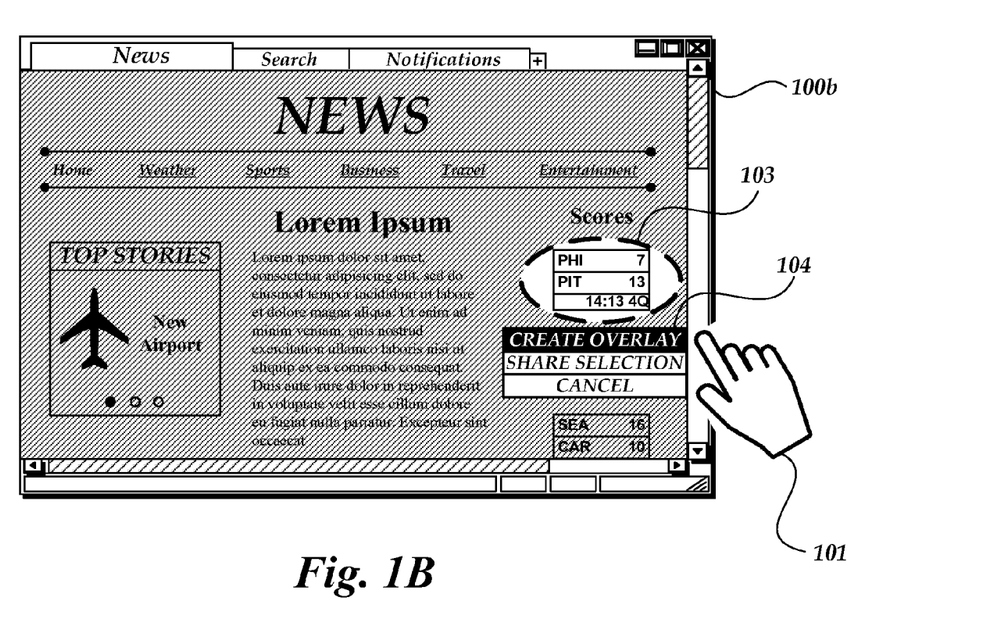

FIG. 1B illustrates a browser interface 100b after a portion of the content page has been selected. A visual effect may be applied to the content page to indicate which portion has been selected by the user. For example, as seen in FIG. 1B, the content page may be "grayed out" while the selected area may remain fully visible to the user. Alternatively, or in addition, an outline may be presented around the selection effect. Options may also be presented to the user regarding actions that may be taken. For example, a popup menu 104 may be displayed near the selected portion 103. The popup menu 104 may be generated by the browser. In some embodiments, the popup menu 104 may appear immediately in response to the user drawing the border, such that no separate activation action is needed. The popup menu 104 may present options to create a notification overlay from the selected portion, share the selected portion with other users, and the like.

Figure 1C:
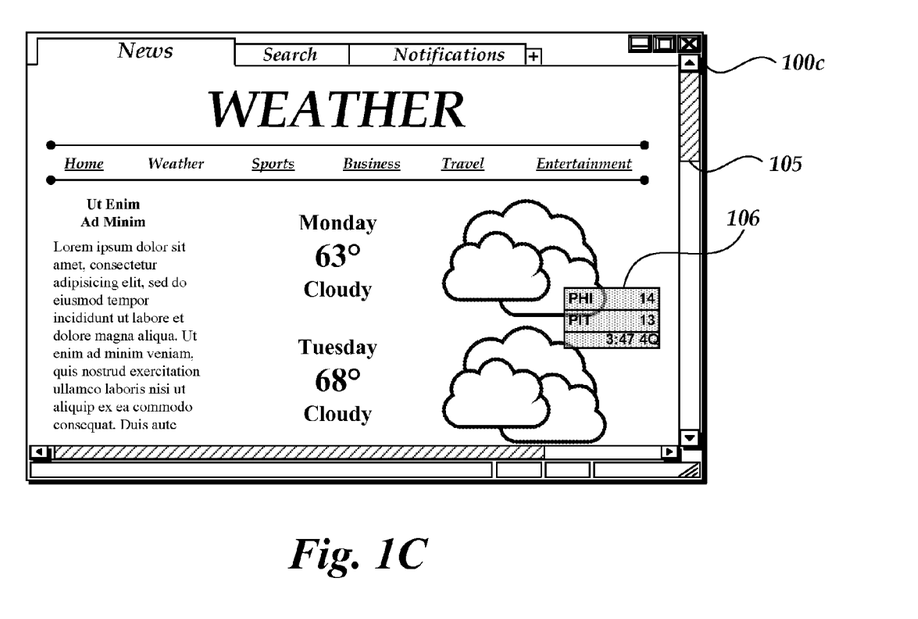
Figure 1D:
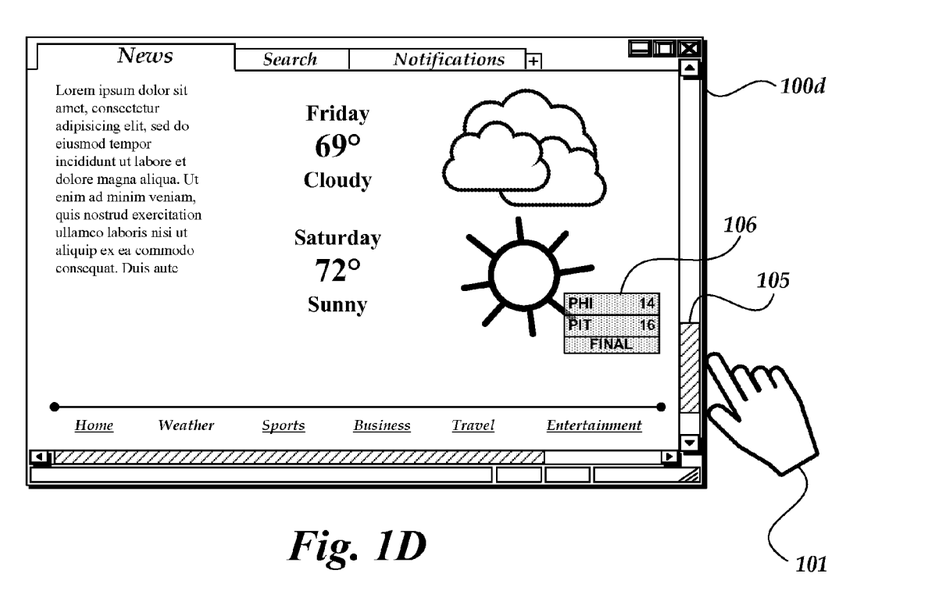

FIG. 1C illustrates a browser interface 100c after a notification overlay has been created from a selected portion. As seen in FIG. 1C, the overlay 106 may be visible even though the user has navigated to a different content page. Whereas the content page in FIGS. 1A and 1B included the selected sports score, the content page displayed in the browser interface 100c of FIG. 1C relates to weather forecasts and does not include sports scores. However, the selected sports score is still displayed to the user as an overlay 106. As seen in FIG. 1D, the overlay 106 may remain in one position within the browser interface 100d, even though the user 101 may scroll 105 to a different portion of the content page.

In some embodiments, the overlay 106 can remain in one position relative to the underlying content page rather than in one position relative to the browser interface (e.g., the overlay can shift up on the display and eventually leave the display if the user scrolls to the bottom of a content page). In some embodiments, the user may position the overlay on an arbitrary portion of the display and anchor the overlay in that position. For example, a user may position the overlay 106 in FIGS. 1C and 1D in the upper left corner of the screen rather than along the right edge. Visual aspects of the overlay may also be customized, such as background color, transparency, font, etc. The visual aspects may be user-defined, or they may be automatically applied based on the currently displayed content page in order to present a more consistent-looking display to the user.

In further embodiments, the overlay 106 may be displayed outside of the browser interface. For example, a user may define the overlay 106 for a particular sports score, as described above. The user may wish to activate a separate application on the client device, such a book reading application, a video game, a movie player, etc. However, the user may wish to continue viewing the overlay 106. In such cases, the user may configure the overlay to remain visible after the browser application is inactive and a separate application has been activated, or even after the browser application has been closed. The user may access a menu or settings interface to specify where and for how long the overlay 106 is to remain visible (e.g., over all applications until the user powers down or logs off of the device; over the browser for the current browsing session only; over the video player until no updates have been received for a period of time; some combination thereof; etc.).

The overlay may be opaque in order to draw the user's attention to the overlay and provide maximum readability. In some embodiments, the overlay may be semi-transparent, allowing the user to see at least some of the content page underneath the overlay. The transparency can be varied automatically based on the content currently behind the overlay. For example, the opacity may be increased when no text is behind the overlay. The opacity or transparency of the overlay may automatically change when content displayed by the overlay changes. For example, the overlay may be displayed partially transparent. When an update to the score is received, the overlay may become less transparent or opaque for a short period of time (e.g., 1 second or 5 seconds) in order to draw the user's attention to the overlay. Other visual treatments may also be applied to the overlay to indicate an update or otherwise draw the user's attention to the overlay. For example, the color of the overlay may change, the overlay may become visible before fading away, etc. Audible effects may be generated, such as a beep or a chime when an update is received and displayed in the overlay.

Networked Content Delivery Environment

Figure 2:
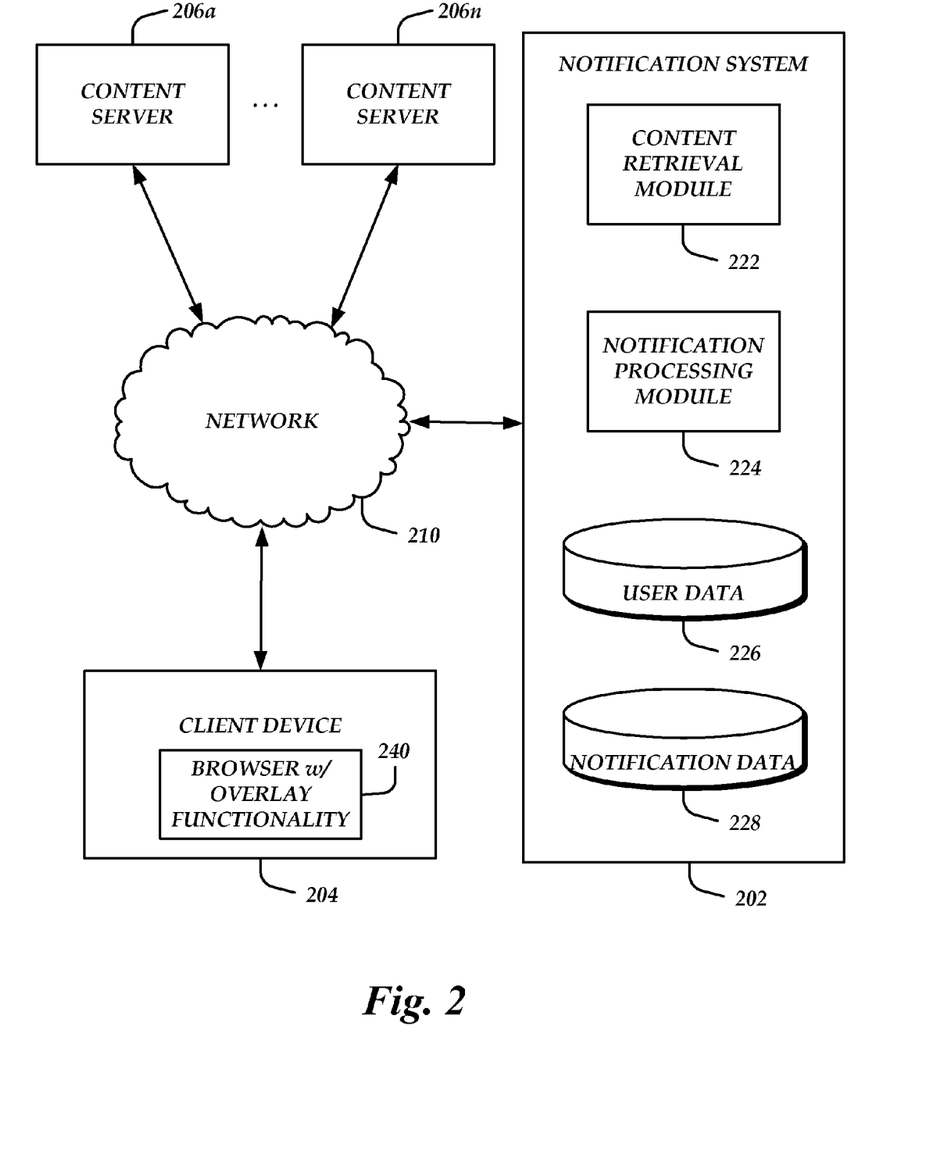
FIG. 2 is a block diagram of an illustrative content delivery environment including a client device, a notification system, and multiple content servers.

Turning now to FIG. 2, an example content delivery environment in which features can be implemented for providing notifications to be displayed in notification overlays will be described. The content delivery environment can include a notification system 202, a client device 204, and any number of content servers 206a-206n. The various systems may communicate with each other via a communication network 210. The network 210 may be a publicly accessible network of linked networks, possibly operated by various distinct parties, such as the Internet. In other embodiments, the network 210 may include a private network, personal area network, local area network, wide area network, cable network, satellite network, cellular telephone network, etc. or combination thereof, each with access to and/or from the Internet.

The notification system 202 can be any computing system that can retrieve content from content servers 206 and transmit notifications to the client device 204. For example, the notification system 202 can be a server or group of servers that may be accessed via the network 210. In some embodiments, the notification system may be an intermediary between the client device 204 and content servers 206. For example, the notification system 202 may be an intelligent proxy server, a system operated by an internet service provider (ISP), or some other device or group of devices that retrieve content on behalf of client devices 204. The notification system 202 can include a number of components, such as a content retrieval module 222, a notification processing module 224, a user data store 226, and a notification data store 228. In some embodiments, the notification system 202 may include additional or fewer components than illustrated in FIG. 2. For example, the notification system 202 may include or otherwise be associated with various additional computing resources, such as content servers 206, content delivery network (CDN) systems, internet service providers (ISPs), and the like.

The notification system 202 may include multiple computing devices, such as computer servers, logically or physically grouped together. The components of the notification system 202 can each be implemented as hardware, such as a server computing device, or as a combination of hardware and software. In addition, the components of the notification system 202 can be combined on one server computing device or separated individually or into groups on several server computing devices. In some embodiments, the notification system 202 can include multiple instances of a single component (e.g., multiple notification processing modules 224). In some embodiments, the features and services provided by the notification system 202 may be implemented as web services consumable via the communication network 210. In further embodiments, the notification system 202 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The client devices 204 can correspond to a wide variety of computing devices, including personal computing devices, laptop computing devices, hand held computing devices, terminal computing devices, mobile devices (e.g., mobile phones, tablet computing devices, etc.), wireless devices, electronic readers, media players, and various other electronic devices and appliances. A client device 204 may be configured with a browser application 240 to communicate via the network 210 with other computing systems, such the notification system 202 or content servers 206, and to request, receive, process, and display content. Illustratively, the browser application 240 may provide functionality to receive user selections of content portions and to present notification overlays on a display of the client device 204.

The content servers 206 can correspond to logical associations of one or more computing devices for hosting content and servicing requests for the hosted content over the network 210. For example, a content server 206 can include a web server component corresponding to one or more server computing devices for obtaining and processing requests for content (such as content pages) from the client device 204, the notification system 202, or other devices or service providers. In some embodiments, one or more content servers 206 may be associated with a CDN service provider, an application service provider, etc.

In operation, one or more client computing devices 204 may be associated with a notification system 202. For example, user of a client computing device 204 may utilize the browser application 240 to request and view content from content servers 206. The user may select or otherwise indicate a portion of a requested content page for which the user wishes to receive update notifications. Data regarding the user selections may be sent to the notification system 202, and the notification system 202 may monitor the selected portion of the content page for changes and transmit update notifications to the client device 204 for display in a notification overlay.

In some embodiments, the task of monitoring the page for updates may alternatively be performed by the browser 240. The user may configure the rate at which the browser 240 checks for updated content, such as through a popup menu that is displayed when a user selects a portion of a content page, as described above with respect to FIG. 1B. For example, a user may instruct the browser 240 to check a sports score once per minute, and the browser 240 can perform this task in the background even after the user has navigated to a different content page.

Figure 3A:
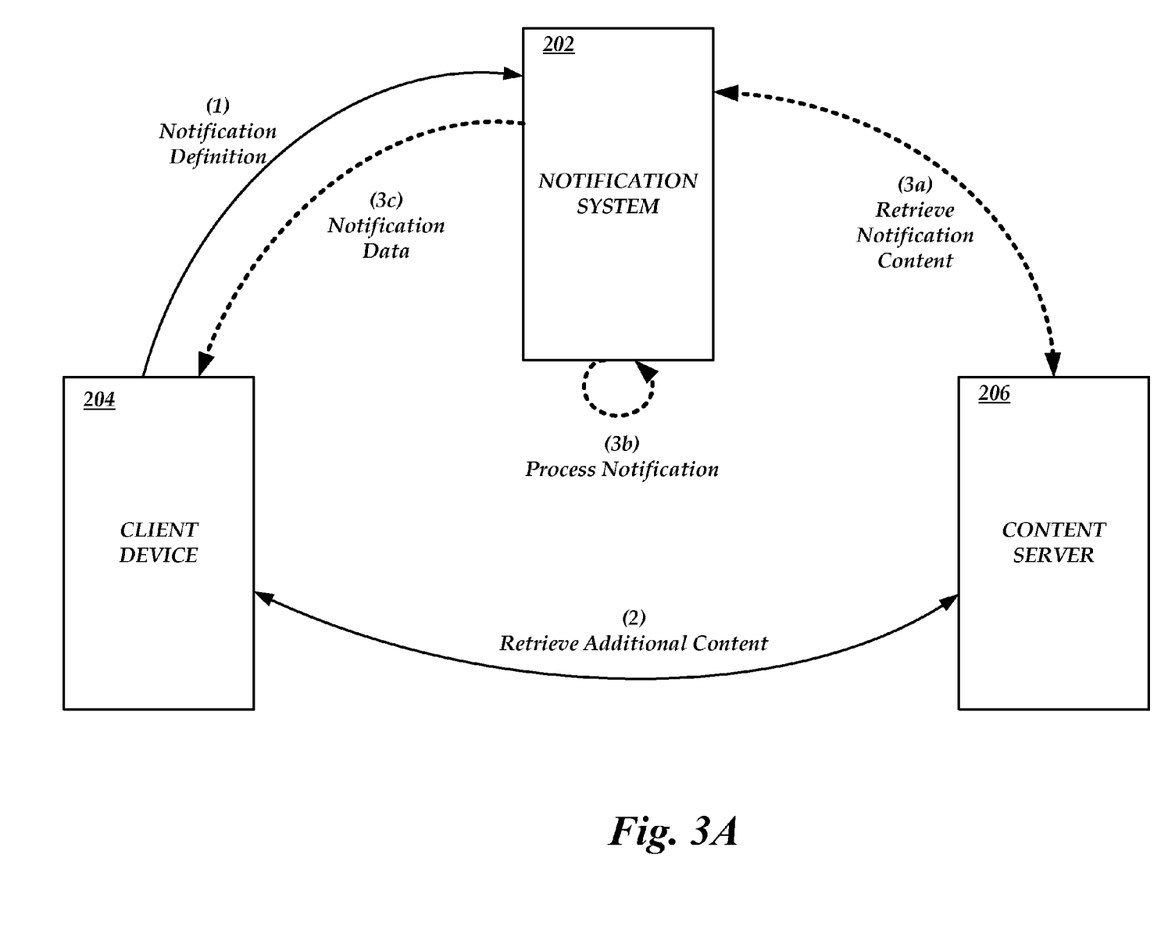
FIG. 3A is a block diagram of illustrative communications and data flows between a client device, a notification system, and a content server.

FIG. 3A illustrates illustrative interactions and data flows between a client device 204, a notification system 202, and a content server 206. As seen in FIG. 3A, data regarding the user selection may be transmitted to the notification system 202 at (1). The data may include the uniform resource locator (URL), internet protocol (IP) address, or some other network address of the content server 206 or particular content page from which the portion was selected. In addition, the data may include coordinates of the selected portion or some identifier of the selected portion, such as an underlying markup language tag. The notification system 202 may store the data in a user data store 226, so that the data may be associated with the user of the client device 204 or the client device 204 itself.

Subsequent to selecting the content portion and transmitting data to the notification system 202, the user of the client device 204 may initiate retrieval of additional content from the content server 206 at (2). For example, the user may navigate to a different content page associated with the previous content page, or the user may request a new content page altogether. In some cases, the client device 204 may retrieve content from a different content server 206.

The notification system 202 may use the content retrieval module 222 or some other module or component to retrieve content from the content server 206 at (3a). For example, the content retrieval module 222 may access data about the selected content portion in the user data store 226. The data may indicate the network address for the content server 206 or particular content page from which the portion was selected. The content retrieval module 222 may then contact the content server 206 and request the content page.

The notification processing module 224 or some other module or component of the notification system 202 can process the retrieved content at (3b) to extract any changes to the content and prepare an update notification. For example, the notification processing module 224 may access data in the user data store 226 regarding the location of the selected portion within the content page. The notification processing module 224 may then locate the selected portion, such as by rendering the content page and locating the coordinates for the selected portion, by identifying the underlying markup language tag in a hypertext markup language (HTML) file defining the content item, or by some other technique. The notification processing module 224 may then prepare an update notification. The update notification may include an updated image of the selected portion of the content page, a video feed or remote desktop protocol (RDP) connection feed of the selected portion, etc. In some cases, the update notification may include data describing changes to the selected portion rather than an image. The notification system 202 can transmit the update notification to the client device 204 at (3c).

In some embodiments, the notification processing module 224 may determine whether the selected portion has changed before preparing an update notification. For example, the notification processing module 224 may access a previous version of the selected portion in the notification data store 228. The current version may be compared to the previous version (e.g., by comparing text appearing in the selected portions, or by computing and comparing checksum values for the respective versions) to determine whether and, in some cases, to what extent the selected portion has changed. If the notification processing module 224 determines that the current version is different than the previously retrieved version, the notification processing module 224 may proceed to prepare an update notification. The notification system 202 can also save data regarding the current version in the notification data store 226 for use in subsequent retrieval and notification processing operations.

The notification system 202 may initiate the content retrieval and notification processing interactions (3a)-(3c) before the client device 204 initiates retrieval of additional content at (2), in parallel with the client device's 204 retrieval of additional content, or after the client device's 204 retrieval of additional content. In addition, the notification system 202 may repeat the interactions (3a)-(3c) on a regular, scheduled, or irregular basis. For example, so long as the client device 204 maintains a network connection with the notification system 202 or is able to be contacted by the notification system 202, the notification system 202 may continue to retrieve content and generate notification updates.

Figure 3B:
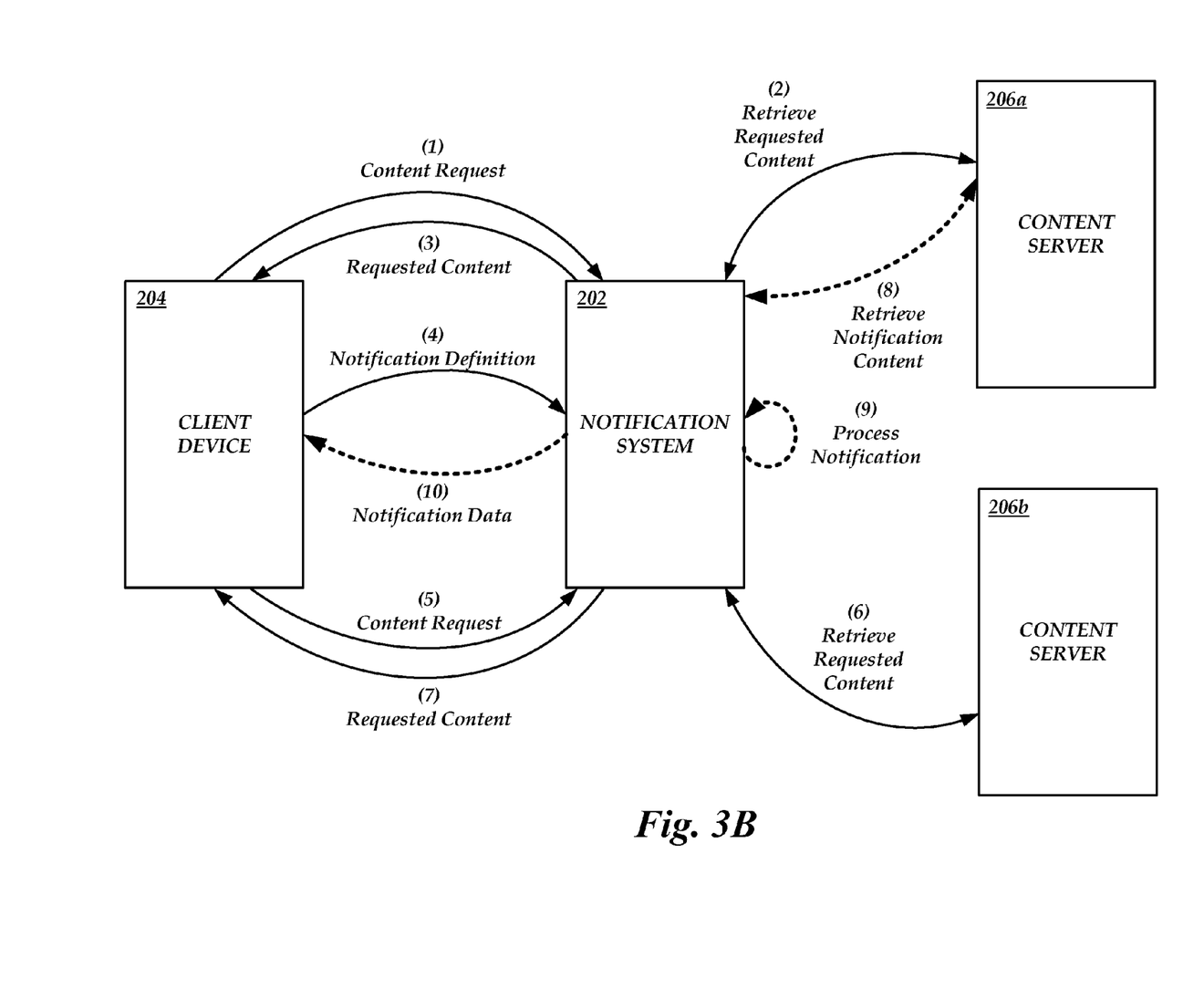
FIG. 3B is a block diagram of illustrative communications and data flows between a client device, a notification system configured as an intermediary system, and multiple content servers.

In some embodiments, the notification system 202 may serve as an intermediary between the client device 204 and content servers 206. For example, the notification system 202 may provide or be part of a larger system that provides proxy and caching services to client devices 204. FIG. 3B illustrates example data flows and content interactions between a client device 204 and a notification system 202 serving as an intermediary between the client device 204 and content servers 206a, 206b. A user of the client device 204 may initialize a browser application 240 and transmit a request for a content page, such as a web page. Due to the association with the intermediary notification system 202, the request may be transmitted to the notification system 202 at (1) rather than directly to a content server 206a offering the content page.

The content retrieval module 222 or some other component of the notification system 202 can retrieve the requested content on behalf of the client device 204 at (2). At (3), the notification system can transmit the retrieved content to the client device 204. In some embodiments, the notification system 202 may process the content in a server-side browser application or some other rendering engine. The results of the processing may be transmitted to the client device 204. The browser 240 of the client device 204 may communicate with the server-side browser, and the two browsers may exchange data regarding the content, split or share various content processing tasks, and the like. One example of a system in which a client-side browser application and a server-side browser application communicate and share processing tasks is disclosed in U.S. patent application Ser. No. 13/174,589, filed on Jun. 30, 2010 and incorporated herein by reference for all that it discloses.

As described above, a user may select a portion of the content page. The client device 204 may transmit data to the notification system 202 at (4), such as data specifying the selected portion. The client device 204 may also request additional content at (5). The request can be a request for content from the same content server 206a, or from a different content server 206b. As described above, the notification system 202 can retrieve the content from the content server 206b on behalf of the user at (6), perform any processing that, as an intermediary system, the notification system 202 is configured to perform, and then transmit the requested content to the client device 204 at (7).

The notification system 202 may retrieve the content page at (8) corresponding to the selected portion for which the notification system 202 received data at (4). The notification system 202 may process the retrieved content at (9) and transmit an update notification to the client device 204 at (10), as described above with respect to FIG. 3A. The notification system 202 may perform content retrieval and notification processing functions prior to, in parallel with, or subsequent to the retrieval of additional content on behalf of the user at (6) and (7).

Sample Overlay Creation and Presentation Process

Figure 4:
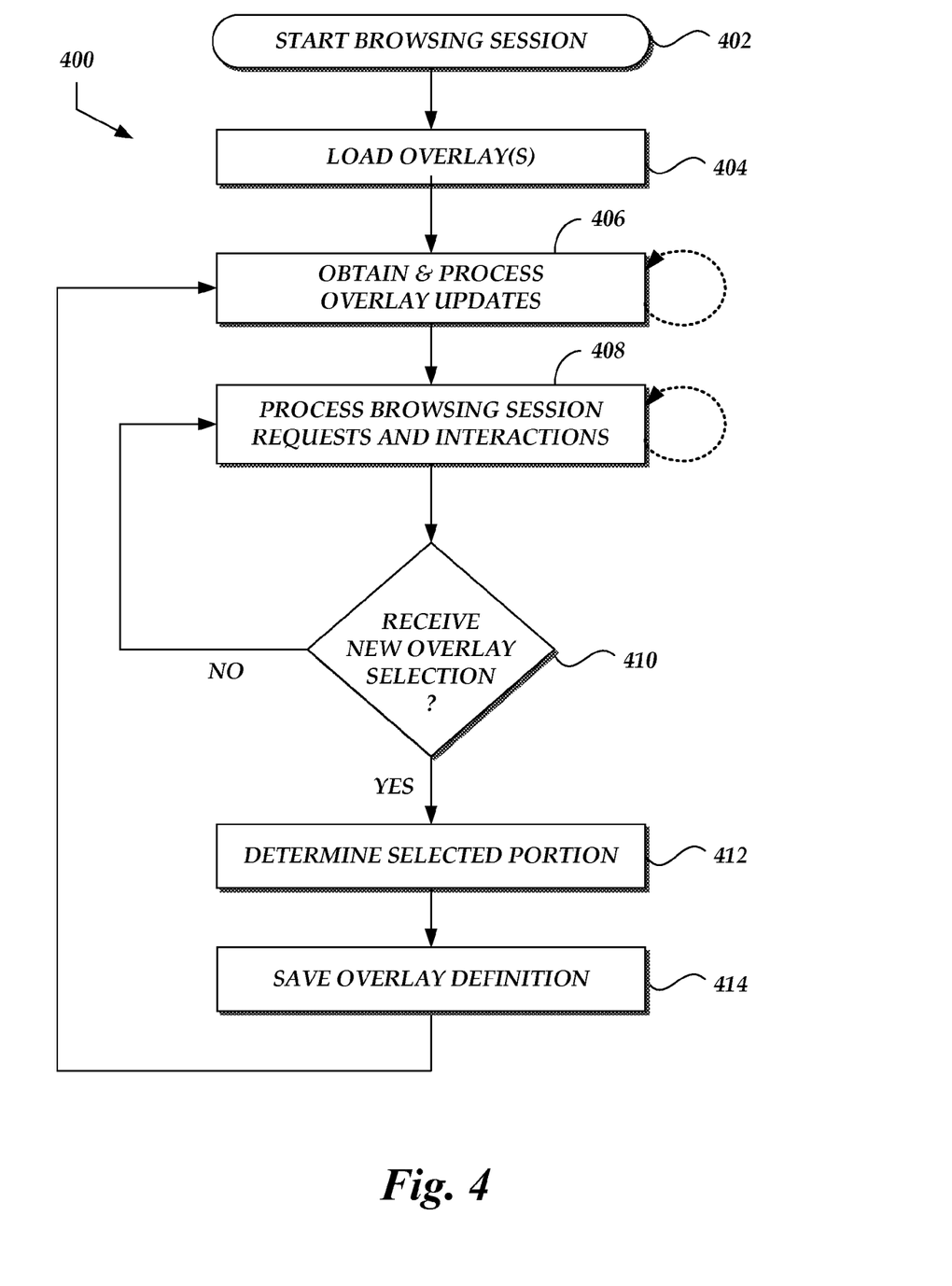
FIG. 4 is a flow diagram of an illustrative process for processing browsing session requests, creating notifications, and displaying notification overlays.

FIG. 4 illustrates a sample process 400 for processing a user browsing session that may include the display of notification overlays and/or the selection of new content portions for which to receive notifications to display in an overlay. Advantageously, a browser application 240 and/or some other component of a client device 204 (such as a browser plug-in or browser toolbar) may execute the process 400 or portions thereof to allow users to select portions of a content page, configure overlays to display content related to the selected portion, and then display and process the overlays and any updates thereto. As a result, a user may be provided with ready access within the browser interface to frequently changing information that the user deems to be of interest. The information may be presented without requiring the user to actively seek updated versions of the information and without requiring the user to pause or otherwise change content browsing behavior. In addition, because the data is displayed in an overlay, the amount of display area available for other content is not reduced, particularly when the overlay is at least partially transparent.

The process 400 begins at block 402 with the initiation of a browsing session on a client device 204. For example, the user may launch a browser application 240 or request content offered by a content server 206.

At block 404, the browser application 240 can load any previously defined overlays. For example, a user may configure the browser application 240 to display a weather or stock quotes overlay during each browsing session. The browser application 240 may load data regarding the overlay and prepare the overlay for display. The data may include a network address for a content page from which to retrieve data for the overlay, coordinates or some other identifier for the portion of the content page corresponding to the overlay, and the like. In some embodiments, the last received update for the overlay may also be loaded and presented to user, or the overlay may not be fully displayed until a current version of the content page portion or other notification data is received. The browser 240 may also contact a notification system 202 to request an update or to initiate processing, by the notification system 202, of notification updates for one or more overlays. The browser 240 may transmit data regarding the particular overlays to the notification system 202 so that the notification system 202 may begin processing updates to the selected portion. In some embodiments, the browser 240 may instead transmit user or device identification data to the notification system 202. The notification system 202 may store data regarding the overlays associated with the user or client device 204 and may begin retrieving content and processing updates based on the previously retrieved data rather than requiring receipt of overlay data in each browsing session.

At block 406, the browser 240 can receive and process updates to the notification overlay(s). For example, the browser 240 may receive from the notification system 202 an image of a selected portion of a content item corresponding to an overlay. The browser 240 may then update the overlay to display the newly received image. FIGS. 1C and 1D illustrate an example. The overlay 106 in FIG. 1C displays a sports score from a game with 3:47 left in the fourth quarter. As time passes and the user optionally interacts with the page, the overlay 106 in FIG. 1D displays an updated final score for the game. The updates may be received from the notification system 202 in real time, on a regular or irregular basis, in response to requests from the client browser application 240, or in response to some other even. For example, rather than capturing an image of the updated content portion and transmitting the image to the browser application 240, the notification system 202 may instead establish a video feed of the portion or a remote desktop connection with the browser application 240. In such cases, changes to the selected portion may be displayed in the overlay on the client device 204 in real time. In additional embodiments, data about changes to the selected portion may be transmitted to the client device 204 rather than images or video of the selected portion. For example, the notification system 202 may compute the difference between the current version of the selected portion and the previously transmitted version of the selected portion. Data describing any difference may then be transmitted to the client device 204, where the browser application 240 can process the difference data and update the overlay.

At block 408, the browser application 240 may process browsing session requests and content interactions. For example, a user may navigate to content pages or request content pages, enter information and otherwise interact with received content pages, etc. Processing of such requests and interactions is well known in the art and will not be described in detail here. However, a user may also initiate selection of a portion of a content page. The portion may be selected for display as an overlay in the browser application 240 or to share with other users for display in browser applications on other client devices 204.

At decision block 410, the browser application can determine whether the user has initiated such a content portion selection. As described above, the user may initiate selection of a content portion by circling a content portion (e.g., using a finger on a touch screen display or using a mouse on a standard display), performing a touch screen gesture recognized by client device 204 (e.g., a triple tap), selecting a menu option, speaking a voice command, or activating some user interface control. If the browser 240 detects that the user has selected a content portion, the process 400 may proceed to block 412. Otherwise, the process 400 may return to block 408 or 406. As shown in FIG. 4, the overlay update processing of block 406 and the browsing session request and interaction processing of block 408 may continue as needed, asynchronously or in parallel with other processing described herein.

At block 412, the browser application 240 can determine which portion of the current content page has been selected. As described above, the browser 240 may determine the coordinates of the selected portion or analyze the content page for markup language tags and other identifiers corresponding to the selected portion.

At block 414, the browser 240 can save an overlay definition for the selected portion. The overlay definition may include the network address or some other identifier of the content page and data describing the selected portion. In some embodiments, the overlay definition may include configuration settings for the overlay. Configuration settings may include a location on the screen at which to display the overlay, a desired update frequency for data in the overlay, visual features of the overlay (e.g., color, font, and level of transparency), length of time to display the overlay when no update has been received, effects to apply to the overlay when an update is received, and the like. The overlay definition may be saved locally, at the notification system 202, or at a combination of the two.

After a new overlay has been defined, the process 400 may return to block 406, where updates to the overlay may be received and process, or to block 408, where additional browsing session requests and interactions are processed.

Users may also discontinue display of an overlay. For example, upon creation, the user can specify a time period (e.g., for the current browsing session only, for a specified number of minutes, or indefinitely). In some embodiments, when the user taps on or hovers a mouse over the overlay, a popup menu or control may appear that allows the user to temporarily or permanently close the overlay.

Additional Embodiments

Figure 5:
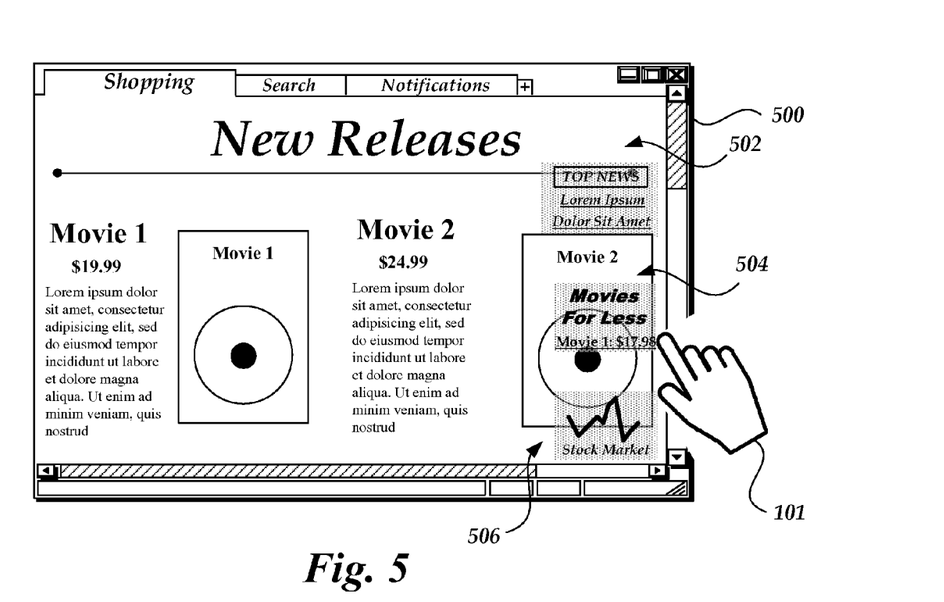
FIG. 5 is a user interface diagram of several illustrative notification overlays, including a context-sensitive notification overlay.

In some embodiments, overlays need not relate to specific portions of a particular content page. For example, an overlay may include context-sensitive information relevant to the content that is currently displayed in the browser, regardless the content server from which the content was received. FIG. 5 illustrates an example of a context-sensitive overlay 504. The browser interface 500 illustrated in FIG. 5 is displaying items for sale (e.g., movies) and prices for the items. The browser 240, a third party retailer, or some other entity may provide a context-sensitive overlay 504 that determines when items on a displayed content page are offered for sale. The context-sensitive overlay 504 may receive data from a notification system regarding other retailers that sell the same item (potentially at a lower price), similar or related items, etc. The context-sensitive overlay 504 may then present data to the user regarding the other sale offer. For example, the context-sensitive overlay 504 may present a link to a different content page that includes an offer for the same item. A user may activate the link and navigate to the target page to view the offer. The notifications in this example may be generated using the methods described in U.S. Pat. No. 7,373,314, the disclosure of which is hereby incorporated by reference.

Context-sensitive overlays are not limited to sale offers. In some embodiments, a context-sensitive overlay may present information or links to content pages that may be related to currently displayed content in other ways. For example, a context-sensitive overlay may present links to related sites or pages, or to content that is more up-to-date than the currently displayed content. In some cases, such as when a notification system 202 is operating as an intermediary system, the overlay may be used to present content related to the currently displayed content that the notification system 202 deems to be of interest to the user based on the user's previous browsing history and on requests in the current browsing session.

Presentation of interactive controls, such as links, in an overlay may give rise to issues regarding ambiguous user interactions. For example, a user may wish to activate a link in an overlay, or the user may wish to activate a link displayed on the content page beneath the overlay. In order to solve such ambiguities, interactive features in transparent overlays may be disabled until some specific user input is received or some other event occurs. In some cases, interactive features may be disabled until the user double-taps or double-clicks on the overlay. In response to receiving such input, the overlay may become opaque and all interactive controls on the overlay may be activated.

Figure 6:
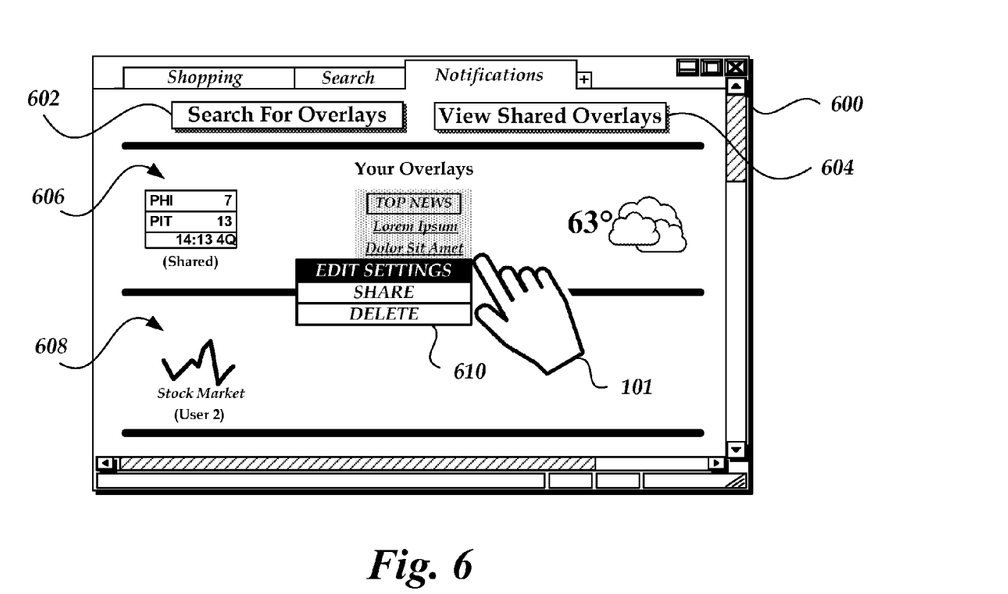
FIG. 6 is a user interface diagram of an illustrative notification overlay summary and configuration screen.

In some embodiments, a single screen, browser tab, or other interface may be provided so that a user may view and optionally configure multiple overlays at a time. FIG. 6 illustrates an example browser tab 600 that may be presented to a user for viewing and interacting with the user's overlays. A user 101 may configure an overlay by selecting the overlay and viewing a popup menu 610 or some other listing of configuration options. For example, the user may edit the display settings (e.g., transparency) or update settings (e.g., frequency) for an overlay, share the overlay with other users, or delete the overlay. The user may search for predefined or shared overlays (e.g., top news stories from a particular content server, stock quotes) created by other users or entities by activating a search control 602. When the user activates the search control 602, the user may be presented with an interface to search for overlays to add to the users' browser 240. The user may also receive direct access to overlays shared from other users such that the user does not need to proactively search for them. In order to add such shared overlays to the user's browser, the user may activate a separate shared overlays control 604.

In some embodiments, overlays may not be displayed persistently on top of other content pages. For example, an overlay may be created to notify a user when the user has received an email. The user may not wish to see the overlay throughout a browsing session, but may instead wish only to see the overlay when the user receives a new email message. When the user receives an email message, the overlay may be displayed on the screen for a short period of time (e.g., 1-5 seconds) and then disappear. However, if the user is not looking at the screen during that short period of time, the user may not see the update notification. Therefore, the user may access the browser tab 600 or some other browser interface to view overlays and determine whether the user has missed any notifications.

In some embodiments, the data collected by the notification system 202 regarding selected portions of pages may be analyzed on an aggregated basis to identify popular content, such as popular pages and/or page elements. The results of such analyses may be used to make various types of recommendations to users. As one example, when a user browses to a particular page that includes an element that is frequently encircled or selected by users, the browser may highlight this element on the page, and/or prompt the user to use the element to generate an overlay notification. As another example, the browser or a web portal may display information regarding the pages or page elements currently being followed by the most users, and may provide a user option to create corresponding notification overlays.

The notification system 202 (or some other component, such as the browser 240) could also perform a user-specific analysis of the history of page portions selected by a particular user. The results of this analysis, optionally combined with the results of an aggregate analysis as described above, could be used to make personalized recommendations for the user. For example, if the user frequently monitors football scores generally, or football scores for a particular team, the system could proactively notify the user of currently-popular overlay options pertaining to football or to a particular team.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by one or more processors or computing devices, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

For example, the process described with respect to FIG. 4 may be embodied in a set of executable program instructions stored on a computer-readable medium, such as one or more disk drives, of the computing system with which the intermediary system is associated. When the process is initiated, the executable program instructions can be loaded into memory, such as RAM, and executed by one or more processors of the computing system. In some embodiments, the computing system may include multiple computing devices, such as servers, and the process may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method for displaying a content overlay, the computer-implemented method comprising:
   causing display, on a display of a client device, of a content item associated with a content server, received from a system in communication with the content server;
   receiving user input indicating selection of a portion of the content item, and providing, to the system, information describing the portion of the content item; and
   causing display, over at least a portion of the content item, of an overlay, the overlay comprising overlay content that includes a stream, received from the system, of the portion of the content page, wherein the overlay remains displayed over at least a portion of a subsequently displayed content item.

2. The computer-implemented method of claim 1, wherein the content item comprises a web page.

3. The computer-implemented method of claim 1, wherein the overlay is at least partially transparent, such that a portion of the subsequently displayed content item beneath the overlay is at least partially visible.

4. The computer-implemented method of claim 1, wherein receiving user input comprises receiving touch screen input or mouse input indicating a perimeter of the selected portion.

5. The computer-implemented method of claim 1, wherein receiving user input comprises receiving a touch screen gesture indicating selection of the selected portion.

6. The computer-implemented method of claim 1, wherein providing information describing the portion comprises:
   identifying coordinates of the selected portion, a markup tag associated with the selected portion, or an object identifier associated with the selected portion.

7. The computer-implemented method of claim 1 further comprising:
   providing, for presentation, configuration options for one or more settings of the overlay, the configuration options comprising one or more user interface elements indicative of visual properties or update properties associated with the overlay.

8. The computer-implemented method of claim 1 further comprising:
   modifying one or more visual properties of the display based at least in part on one or more visual properties of the subsequently displayed content item.

9. The computer-implemented method of claim 1 further comprising:
   sharing data regarding the overlay with an additional user sufficient to enable display of the overlay on an additional client device associated with the additional user.

10. The method of claim 1, wherein the stream of the portion of the content page comprises video of the portion.

11. A system for displaying content overlays, the system comprising:
    one or more processors;
    a computer-readable memory; and
    executable instructions stored in the computer-readable memory, wherein the one or more processors are programmed by the executable instructions to at least:
       retrieve, from a system in communication a content server, a content page associated with the content server;
       provide, for presentation to a user, the content page;
       receive user input indicating a selection of a portion of the content page, and providing, to the system, information describing the portion of the content page;
       cause display, over at least a portion of the content page, of an overlay comprising overlay content that includes a stream, received from the system, of the portion of the content page, wherein the overlay remains displayed over a subsequently displayed content page and comprises context information associated with the subsequently displayed content page.

12. The system of claim 1, wherein the overlay is at least partially transparent such that a portion of a subsequently displayed content page underneath the overlay is at least partially visible.

13. The system of claim 1, wherein the one or more processors are further programmed to at least:
    provide, to the user, configuration options for one or more settings of the overlay, the configuration options comprising one or more user interface elements indicative of visual properties or update properties associated with the overlay.

14. The system of claim 1, wherein the overlay content comprises an interactive user interface element.

15. The system of claim 1, wherein the stream of the portion of the content page comprises video of the portion.

16. A non-transitory computer storage medium comprising a browser module configured to execute a process on a client device, the process comprising:

causing display, in a content display window, of a content page associated with a content server, received from a system in communication with the content server;

receiving user input indicating selection of a portion of the content item, and providing, to the system, information describing the portion of the content item; and     causing display, over at least a portion of the content page, of an overlay, the overlay overly comprising overlay content that includes a stream, received from the system, of the portion of the content page, wherein the overlay remains displayed over at least a portion of a subsequently displayed content page.

17. The non-transitory computer storage medium of claim 16, wherein the browser module comprises a browser plug-in.

18. The non-transitory computer storage medium of claim 16, wherein the stream of the portion of the content page comprises video of the portion.

19. A computer-implemented method for displaying a content overlay, the computer-implemented method comprising:

receiving, on a client device, user input regarding selection of a portion of a content page displayed in a browser application, the content page received from a system in communication with a content server that hosts the content page;

providing, to the system, information describing the portion of the content page;

establishing a remote desktop connection between the client device and the system: and     causing display, on the client device, of an overlay, comprising overlay content that includes the portion of the content page received over the remote desktop connection, over at least a portion of a second application separate from the browser application, wherein the overlay remains displayed over at least the portion of the second application after display of a subsequent content page.

20. The computer-implemented method of claim 19, wherein the overlay is at least partially transparent, such that a portion of the second application beneath the overlay is at least partially visible.

21. The computer-implemented method of claim 19, wherein providing information describing the portion comprises:

identifying coordinates of the selected portion, a markup tag associated with the selected portion, or an object identifier associated with the selected portion.

\* \* \* \* \*